(12) United States Patent
Grissom et al.

(10) Patent No.: US 9,181,856 B2
(45) Date of Patent: Nov. 10, 2015

(54) EXHAUST DRIVEN AUXILIARY AIR PUMP AND PRODUCTS AND METHODS OF USING THE SAME

(75) Inventors: Thomas A. Grissom, Dexter, MI (US); Volker Joergl, Breitenfurt (AT)

(73) Assignee: BorgWarner Inc., Auburn Hills, MI (US)

(*) Notice: Subject to any disclaimer, the term of this patent is extended or adjusted under 35 U.S.C. 154(b) by 781 days.

(21) Appl. No.: 12/991,953

(22) PCT Filed: May 14, 2009

(86) PCT No.: PCT/US2009/043977
§ 371 (c)(1),
(2), (4) Date: Feb. 7, 2011

(87) PCT Pub. No.: WO2009/142989
PCT Pub. Date: Nov. 26, 2009

(65) Prior Publication Data
US 2011/0265471 A1 Nov. 3, 2011

Related U.S. Application Data

(60) Provisional application No. 61/055,739, filed on May 23, 2008.

(51) Int. Cl.
*F02B 33/44* (2006.01)
*F01N 5/04* (2006.01)
(Continued)

(52) U.S. Cl.
CPC .............. *F02B 37/013* (2013.01); *F01N 3/023* (2013.01); *F01N 3/025* (2013.01); *F01N 3/306* (2013.01); *F01N 3/32* (2013.01); *F02B 37/001* (2013.01); *F02B 37/004* (2013.01); *F02B 37/18* (2013.01);
(Continued)

(58) Field of Classification Search
CPC .... F02B 37/001; F02B 37/002; F02B 37/004; F02B 37/005; F02B 37/007; F03M 25/0711; F01N 3/32; F01N 3/22; F01N 3/02; F01N 3/30; F01N 3/306; F01N 3/326; F01N 3/34; F01N 3/36; F01N 3/38
USPC .............. 60/280, 286, 289, 303, 612; 123/26, 123/562
See application file for complete search history.

(56) References Cited

U.S. PATENT DOCUMENTS 2,173,595 A * 9/1939 Schutte ........................... 60/606
3,666,396 A * 5/1972 Briggs et al. .................. 431/264
(Continued)

FOREIGN PATENT DOCUMENTS

DE 2435004 A * 2/1976
DE 102007058964 A1 * 6/2009 .............. F02B 37/00
(Continued)

OTHER PUBLICATIONS

Development of a Turbocharger Booster System by Chapman published Oct. 1, 2007.*
(Continued)

*Primary Examiner* — Thomas Denion
*Assistant Examiner* — Jessica Kebea
(74) *Attorney, Agent, or Firm* — BrooksGroup (57) ABSTRACT

One exemplary embodiment may include an engine breathing system including an exhaust driven auxiliary air pump to flow air directly into the exhaust side of the breathing system.

24 Claims, 5 Drawing Sheets

(51) Int. Cl.
*F01N 3/00* (2006.01)
*F02B 33/00* (2006.01)
*F02B 37/013* (2006.01)
*F01N 3/023* (2006.01)
*F01N 3/025* (2006.01)
*F01N 3/30* (2006.01)
*F01N 3/32* (2006.01)
*F02B 37/00* (2006.01)
*F02B 37/18* (2006.01)
*F02B 37/24* (2006.01)
*F02M 25/07* (2006.01)

(52) U.S. Cl.
CPC ............ *F02B 37/24* (2013.01); *F02M 25/0707* (2013.01); *F02M 25/0727* (2013.01); *Y02T 10/144* (2013.01)

(56) References Cited

U.S. PATENT DOCUMENTS

| | | | |
|---|---|---|---|
| 3,676,999 A * | 7/1972 | Oldfield | 60/606 |
| 3,967,929 A * | 7/1976 | Tamazawa et al. | 422/109 |
| 4,548,039 A * | 10/1985 | Dinger et al. | 60/606 |
| 5,081,836 A * | 1/1992 | Smith et al. | 60/280 |
| 5,090,200 A | 2/1992 | Arai | |
| 6,227,180 B1 * | 5/2001 | Hoffmann et al. | 123/564 |
| 6,467,257 B1 * | 10/2002 | Khair et al. | 60/278 |
| 6,895,745 B2 * | 5/2005 | Roby | 60/280 |
| 7,162,865 B2 * | 1/2007 | Weigand et al. | 60/289 |
| 8,365,519 B2 * | 2/2013 | Wirbeleit et al. | 60/304 |
| 2003/0106309 A1 * | 6/2003 | Morimoto et al. | 60/295 |
| 2005/0109029 A1 * | 5/2005 | Busch | 60/605.1 |
| 2006/0096279 A1 * | 5/2006 | Freisinger et al. | 60/289 |
| 2006/0242946 A1 * | 11/2006 | Taylor et al. | 60/279 |
| 2007/0144170 A1 * | 6/2007 | Griffith | 60/600 |
| 2007/0283697 A1 * | 12/2007 | Winsor | 60/605.1 |
| 2008/0006031 A1 * | 1/2008 | Schick et al. | 60/606 |
| 2008/0256951 A1 * | 10/2008 | Delavan | 60/624 |
| 2010/0011761 A1 * | 1/2010 | Wirbeleit et al. | 60/600 |
| 2013/0232972 A1 * | 9/2013 | Heiermann | 60/605.2 |

FOREIGN PATENT DOCUMENTS

| | | | | |
|---|---|---|---|---|
| FR | 2931514 A3 * | 11/2009 | | F01N 3/023 |
| GB | 2319736 A * | 6/1998 | | |
| JP | 61201826 A | 9/1983 | | |
| JP | 59153918 A | 9/1984 | | |
| JP | 61178519 A | 8/1986 | | |
| JP | 03011112 A * | 1/1991 | | |
| JP | 08135457 A | 5/1996 | | |
| JP | 09-100715 A | 4/1997 | | |
| JP | 10103069 A | 4/1998 | | |
| JP | 2001065356 A | 3/2001 | | |
| JP | 2001214733 A | 8/2001 | | |
| JP | 2005042604 A | 7/2003 | | |
| JP | 2006307811 A | 11/2006 | | |
| JP | 2007255256 A | 10/2007 | | |
| WO | 2006118637 A2 | 11/2006 | | |

OTHER PUBLICATIONS

Chinese First Office Action dated Aug. 14, 2012: Application SN:200980115798.1; Applicant: BorgWarner Inc.; 19 pages.
Chinese Office Action dated May 22, 2013; Application No. 200980115798.1; Applicant: BorgWarner Inc.; 17 pages.
Japanese Office Action dated Apr. 12, 2013; Applicant: BorgWarner Inc; Applicant No. 2011-510588; 8 pages.
Chinese Office Action dated Feb. 6, 2015 ; Application No. 200980115798.1 ; Applicant : BorgWarner Inc.; 8 pages.
Chinese Office Action dated May 19, 2015; Application No. 200980115798.1; Applicant: BorgWarner Inc.; 8 pages.

* cited by examiner

EXHAUST DRIVEN AUXILIARY AIR PUMP AND PRODUCTS AND METHODS OF USING THE SAME

This application claims the benefit of U.S. Provisional Application No. 61/055,739 filed May 23, 2008 and PCT Application No. US09/43977 filed May 14, 2009.

TECHNICAL FIELD

The field to which the disclosure generally relates includes combustion engine breathing systems, components thereof, turbocharger systems and components and methods of making and using the same.

BACKGROUND

Figure 1:
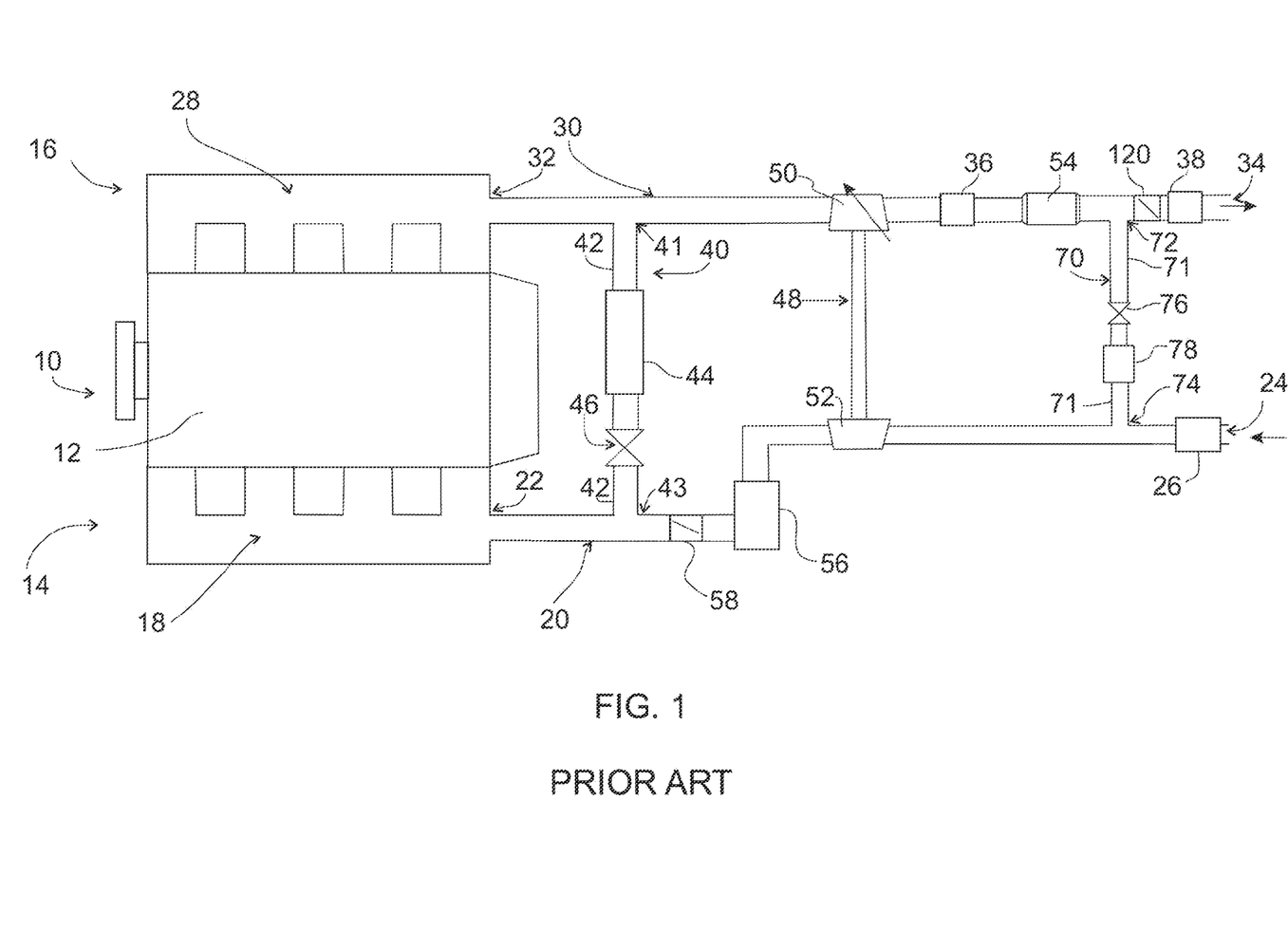
FIG. 1 is a schematic illustration of a prior art system including a modern breathing system for use with a single stage turbocharger.

FIG. 1 is a schematic illustration of a product or system 10 including a modern breathing system used for a single stage turbocharger. Such a system may include a combustion engine 12 constructed and arranged to combust a fuel such as, but not limited to, gasoline or diesel fuel in the presence of oxygen. The system may further include a breathing system including an air intake side 14 and a combustion gas exhaust side 16. The air intake side 14 may include a manifold connected to the combustion engine to feed air into the cylinders of the combustion engine 12. A primary air intake conduit 20 may be provided and connected at one end to the air intake manifold 18 (or made a part thereof) and may include an open end 24 for drawing air there through. An air filter 26 may be located at or near the open end 24 of the air intake conduit 20.

The combustion gas exhaust side 16 may include an exhaust manifold 28 connected to the combustion engine 12 to exhaust combustion gases therefrom. The exhaust side 16 may further include a primary exhaust conduit 30 having a first end 32 connected to the exhaust manifold 28 (or made a part thereof) and may have an open end 34 for discharging exhaust gas to the atmosphere.

Such a system 10 may further include a first exhaust gas recirculation (EGR) assembly 40 extending from the combustion gas exhaust side 16 to the air intake side 14. A first EGR valve 46 may be provided in fluid communication with the primary exhaust gas conduit 30 and constructed and arranged to flow exhaust gas from the exhaust side 16 to the air intake side 14 and into the combustion engine 12. The first EGR assembly 40 may further include a primary EGR line 42 having a first end 41 connected to the primary exhaust gas conduit 30 and a second end 43 connected to the air intake conduit 20. A cooler 44 may be provided in fluid communication with the primary EGR line 42 for cooling the exhaust gas flowing therethrough.

The system 10 may further include a turbocharger 48 having a turbine 50 in fluid communication with the primary exhaust gas conduit 30 and having a compressor 52 in fluid communication with the primary air intake conduit 20 to compress gases such as, but not limited to, air flowing there through. An air charge cooler 56 may be provided in the primary air intake conduit 20 downstream of the compressor 52. A throttle valve 58 may be provided in the primary air intake conduit 20 downstream out of compressor 52 and upstream of the connection point of the second end 43 of the primary EGR line 42 to the primary air intake conduit 20.

A number of the emission control components may be provided in a primary exhaust gas conduit line 30 typically downstream of the turbine 50. For example, a particulate filter 54 may be provided downstream of the turbine 50. Other emission control components such as, but not limited to, a catalytic converter 36 and a muffler 38 may also be provided downstream of the turbine 50. Further exhaust aftertreatment devices such as lean $NO_X$ traps may also be provided.

Optionally a second exhaust gas recirculation (EGR) assembly 70 may be provided extending from the combustion exhaust gas side 16 at a location downstream of the turbine 50 to the air intake side 14. The second EGR assembly 70 may include a second EGR line 71 having a first end 72 connected to the primary exhaust gas conduit 30 and a second end 74 connected to the air intake conduit 20. A cooler 78 may be provided in fluid communication with the second EGR line 71 for cooling exhaust gases flowing there through. A second EGR valve 76 may be provided and constructed and arranged to control the amount of exhaust gas flowing through the second EGR line 71. An exhaust throttle valve 120 may be provided in the primary exhaust conduit 30 downstream of the connection point of the first end of the second EGR line to the primary exhaust gas conduit 30. The exhaust gas throttle valve 120 may be utilized to control the amount of exhaust gas going into the second EGR line 71.

When such a system 10 includes a particulate filter 54, particulate matter such as, but not limited to soot, is collected in the particulate filter 54. If too much particulate matter is allowed to accumulate in the particulate filter 54, such may adversely impact operation of the system 10 or various components thereof or may adversely impact emissions. The particulate filter 54 may be regenerated to burn off the particulate matter allowing the particulate filter 54 to be used to more effectively collect more particulate matter without adversely impacting the operation of the system 10.

Figure 2:
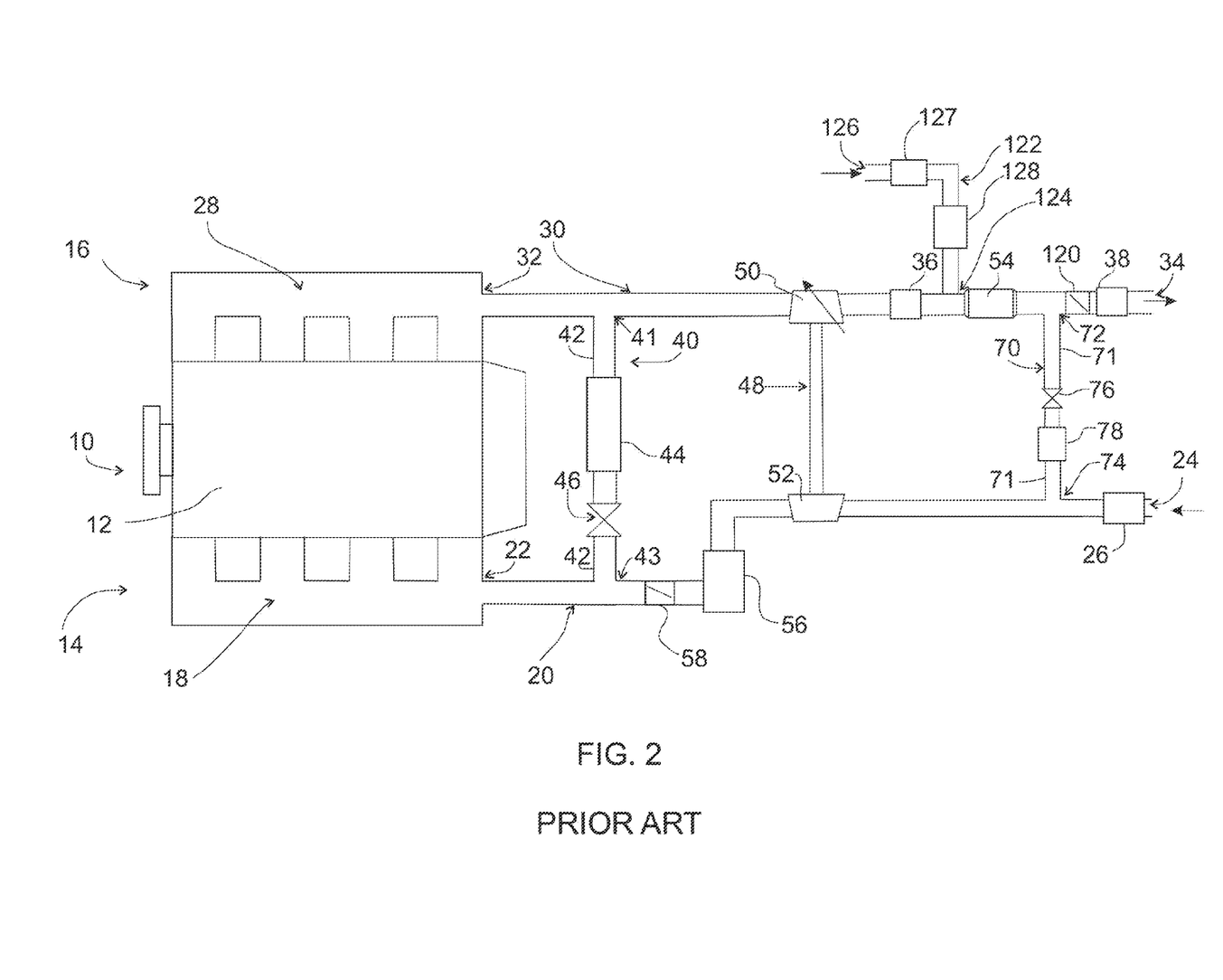
FIG. 2 is a schematic illustration of a prior art system including a modern breathing system used for a single stage turbocharger.

Referring now to FIG. 2, in a system 10 similar to that illustrated in FIG. 1, a second air intake line 122 may be provided and may have a first end 124 connected to the primary exhaust gas conduit 30 and a second open end 126 to draw air from the atmosphere. A blower 127 may be provided in the second air intake conduit 122 to force air into the primary exhaust gas conduit 30 at a location upstream of the particulate filter 54. A burner 128 may also be provided to heat the air flowing through the second air intake line 122 to facilitate regeneration of the particulate filter 54. Such blowers 127 are typically constructed and arranged to provide a pressure ratio of the absolute outlet pressure over the inlet pressure of less than or equal to 1.1.

SUMMARY OF EXEMPLARY EMBODIMENTS OF THE INVENTION

One exemplary embodiment may include an air breathing system including an exhaust driven air pump constructed and arranged to deliver compressed air into a primary exhaust gas conduit at a location upstream of a particulate filter to provide oxygen for the regeneration of the particulate filter. In one exemplary embodiment, an exhaust driven air pump may be smaller than a primary turbocharger. The exhaust driven air pump may deliver the air into the primary exhaust gas conduit from a primary air intake conduit connected to a combustion engine to deliver air into the cylinders thereof or from a second air intake conduit having an open end.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 3:
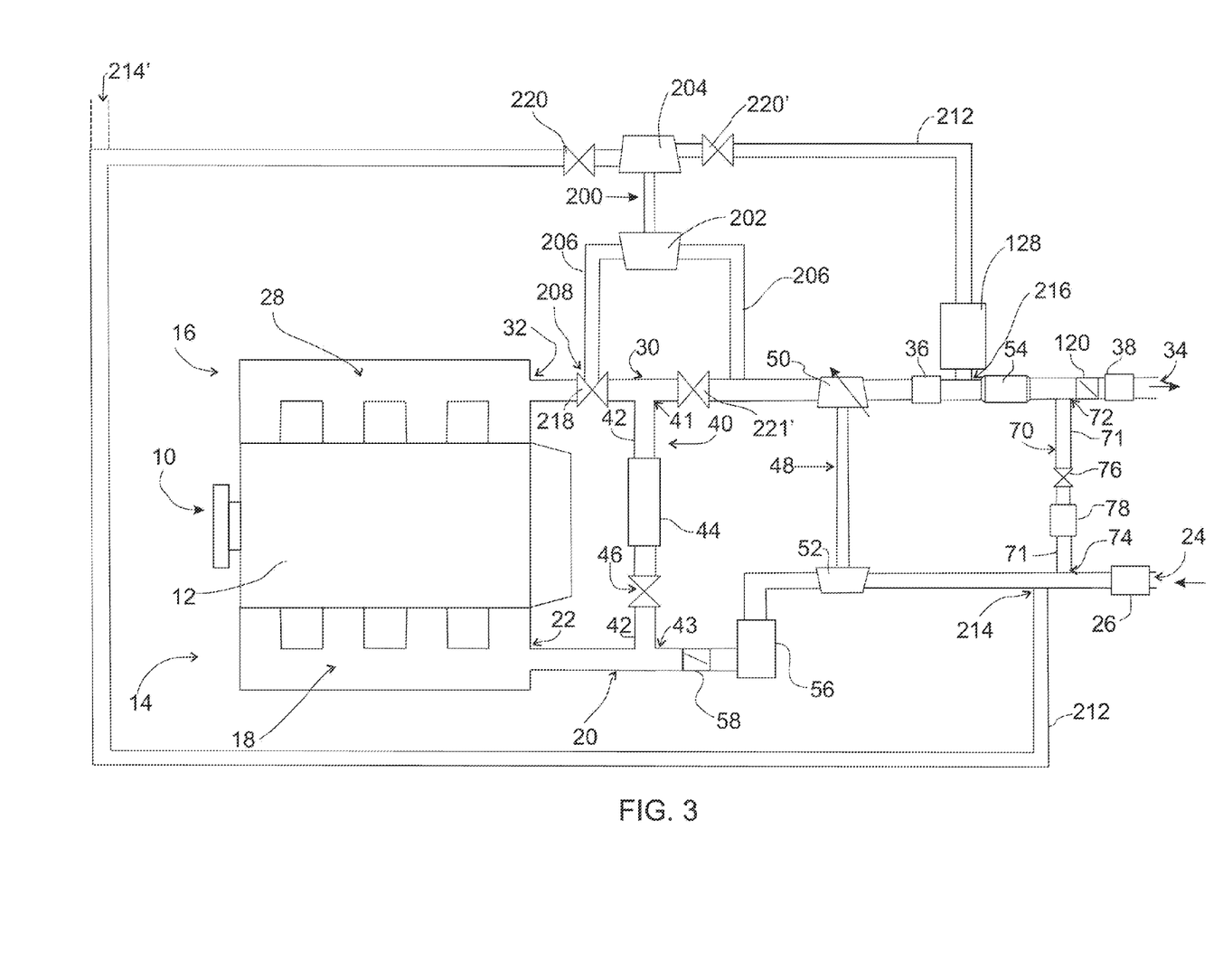
FIG. 3 is a schematic illustration of a system including an exhaust driven air pump according to one exemplary embodiment of the invention.

FIG. 3 illustrates an embodiment which may be similar in several respects to that illustrate in FIG. 1. FIG. 3. also is a schematic illustration of a product or system 10 including a engine breathing system. Such a system may include a combustion engine 12 constructed and arranged to combust a fuel such as, but not limited to, gasoline or diesel fuel in the presence of oxygen. The system may further include a breathing system including an air intake side 14 and a combustion gas exhaust side 16. The air intake side 14 may include a manifold connected to the combustion engine to feed air into the cylinders of the combustion engine 12. A primary air intake conduit 20 may be provided and connected at one end to the air intake manifold 18 (or made a part thereof) and may include an open end 24 for drawing air there through. An air filter 26 may be located at or near the open end 24 of the air intake conduit 20.

The combustion gas exhaust side 16 may include an exhaust manifold 28 connected to the combustion engine 12 to exhaust combustion gases therefrom. The exhaust side 16 may further include a primary exhaust conduit 30 having a first end 32 connected to the exhaust manifold 28 (or made a part thereof) and may have an open end 34 for discharging exhaust gas to the atmosphere.

Such a system 10 may further include a first exhaust gas recirculation (EGR) assembly 40 extending from the combustion gas exhaust side 16 to the air intake side 14. A first EGR valve 46 may be provided in fluid communication with the primary exhaust gas conduit 30 and constructed and arranged to flow exhaust gas from the exhaust side 16 to the air intake side 14 and into the combustion engine 12. The first EGR assembly 40 may further include a primary EGR line 42 having a first end 41 connected to the primary exhaust gas conduit 30 and a second end 43 connected to the air intake conduit 20. A cooler 44 may be provided in fluid communication with the primary EGR line 42 for cooling the exhaust gas flowing therethrough.

The system 10 may further include a first or primary turbocharger 48 having a turbine 50 in fluid communication with the primary exhaust gas conduit 30 and having a compressor 52 in fluid communication with the primary air intake conduit 20 to compress gases such as, but not limited to, air flowing there through. The first or primary turbocharger may be sized so that the first compressor 50 has the capacity to deliver at least 100 percent of the intake air required by a combustion engine 12 of the system 10. An air charge cooler 56 may be provided in the primary air intake conduit 20 downstream of the compressor 52. A throttle valve 58 may be provided in the primary air intake conduit 20 downstream out of compressor 52 and upstream of the connection point of the second end 43 of the primary EGR line 42 to the primary air intake conduit 20.

A number of the emission control components may be provided in a primary exhaust gas conduit line 30 typically downstream of the turbine 50. For example, a particulate filter 54 may be provided downstream of the turbine 50. Other emission control components such as, but not limited to, a catalytic converter 36 and a muffler 38 may also be provided downstream of the turbine 50. The location of the catalytic converter 36 is not limited to that illustrated in FIG. 3 but may be located at a variety of positions in the exhaust side 16. Further exhaust after treatment devices such as lean $NO_X$ traps may also be provided.

Optionally a second exhaust gas recirculation (EGR) assembly 70 may be provided extending from the combustion exhaust gas side 16 at a location downstream of the turbine 50 to the air intake side 14. The second EGR assembly 70 may include a second EGR line 71 having a first end 72 connected to the primary exhaust gas conduit 30 and a second end 74 connected to the air intake conduit 20. A cooler 78 may be provided in fluid communication with the second EGR line 71 for cooling exhaust gases flowing there through. A second EGR valve 76 may be provided and constructed and arranged to control the amount of exhaust gas flowing through the second EGR line 71. An exhaust throttle valve 120 may be provided in the primary exhaust conduit 30 downstream of the connection point of the second end of the second EGR line to the primary exhaust gas conduit 30. The exhaust gas throttle valve 120 may be utilized to control the amount of exhaust gas going into the second EGR line 71. FIG. 3 differs from FIG. 1 in that the system 10 also includes a second turbocharger 200 utilized to deliver compressed air directly into the exhaust side 16.

Referring again to FIG. 3, one exemplary embodiment may include a product or system 10 which may include an air intake side 14 constructed and arranged to deliver air to a combustion engine 12 and an exhaust side 16 constructed and arranged to exhaust combustion gases produced by the combustion engine 12. Optionally, a first turbocharger 48 may be provided and may include a turbine 50 in fluid communication with the exhaust side 16 and a compressor 52 in fluid communication with the air intake side 14 to compress air to be delivered to the combustion engine 12.

A second exhaust conduit 206 may be provided having a first end 208 connected at a first location of the exhaust side 16 and a second end 210 connected at a second location of the exhaust side 16. A second air conduit 212 may be provided having an air intake end or air-receiving end 214 and a second end 216 connected to the exhaust side 16 upstream of a particulate filter 54. An exhaust driven air pump 200 may be provided including a second turbine 202 in fluid communication with the second exhaust gas conduit 206 and a second compressor 204 in fluid communication with the second air conduit 212 constructed and arranged to deliver compressed air into the exhaust side 16 upstream of the particulate filter 54 which may be used in one embodiment to enhance regeneration of the filter. A burner 128 may be provided to heat the compressed air flowing through the second air conduit 212.

The burner 128 may be constructed and arranged to burn a fuel such as, but not limited to gasoline or diesel fuel. In one embodiment, the burner 128 is constructed and arranged to utilize compressed air to combust the fuel. In one exemplary embodiment, the first end 208 of the second exhaust gas conduit 206 may be connected to the exhaust side 16 at a location downstream of the exhaust manifold 28 and upstream of the connection of the primary EGR line 42 to the exhaust side 16. In one exemplary embodiment, the second end 210 of the second exhaust gas conduit 206 may be connected to the exhaust side 16 at a location downstream of the connection of the primary EGR line 42 and upstream of the first turbine 50. In one embodiment, the air intake end 214 may be connected to the air intake side 14 at a location downstream of the open end 24. Alternatively, or in combination therewith, the air intake end 214' of the second air conduit 212 may be open to the atmosphere.

In one exemplary embodiment a first air valve 220 and/or second air valve 220' may be provided in the second air conduit 212 on either side of the second compressor 204 to control flow of air through the second compressor 204 and into the exhaust side 16. In one exemplary embodiment a first exhaust valve 218 and/or second exhaust valve 218' may be provided at the connection point of the first end 208 of the second exhaust gas conduit 206 to the exhaust side 16 or downstream of such connection point to control the flow of exhaust gas through the second exhaust conduit 206 and the second turbine 202. The second end 210 of the second exhaust conduit 206 may be connected to the exhaust side 16 at a location downstream of a first EGR assembly 40 and upstream of the first turbine 50 in one exemplary embodiment.

In one embodiment the valve 220, and/or 220' may be provided in the housing of the auxiliary air pump. The auxiliary air pump housing may be a single piece of cast material or two or more pieces connected together. In another embodiment, the auxiliary air pump may be housed with at least one of the valves 220, 220' or the burner 128.

Figure 4:
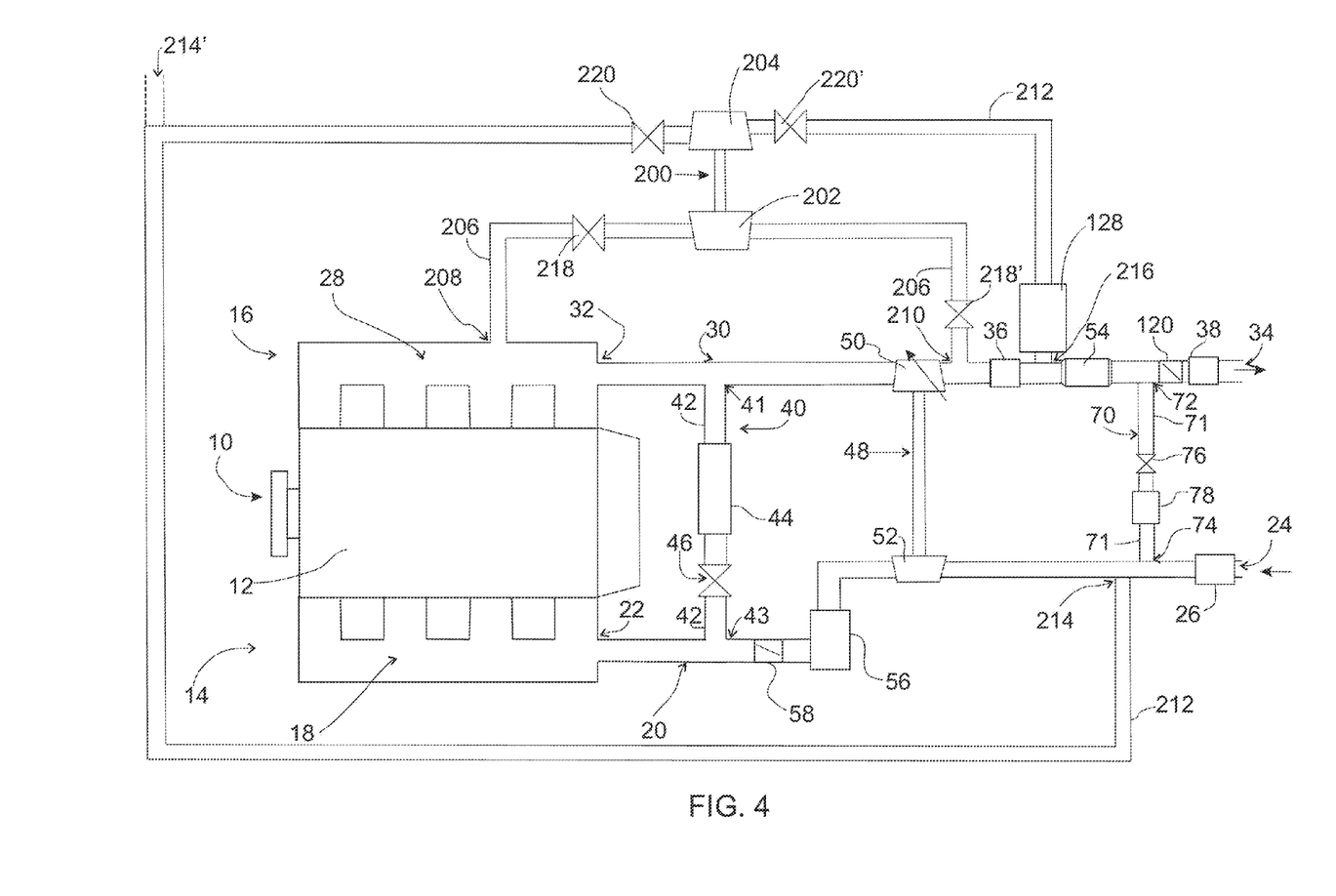
FIG. 4 is a schematic illustration of a system an exhaust driven air pump according to another exemplary embodiment of the invention.

Referring now to FIG. 4, in another exemplary embodiment, the first end 208 of the second exhaust conduit 206 may be connected to the exhaust side 16 at the exhaust gas manifold 28 that is connected to the engine 12. In one exemplary embodiment the second end 210 of the second exhaust gas conduit 206 may be connected to the exhaust side 16 at a location downstream of the first turbine 50 and upstream of the connection of the second end 216 of the second air conduit 212 to the exhaust side 16.

Figure 5:
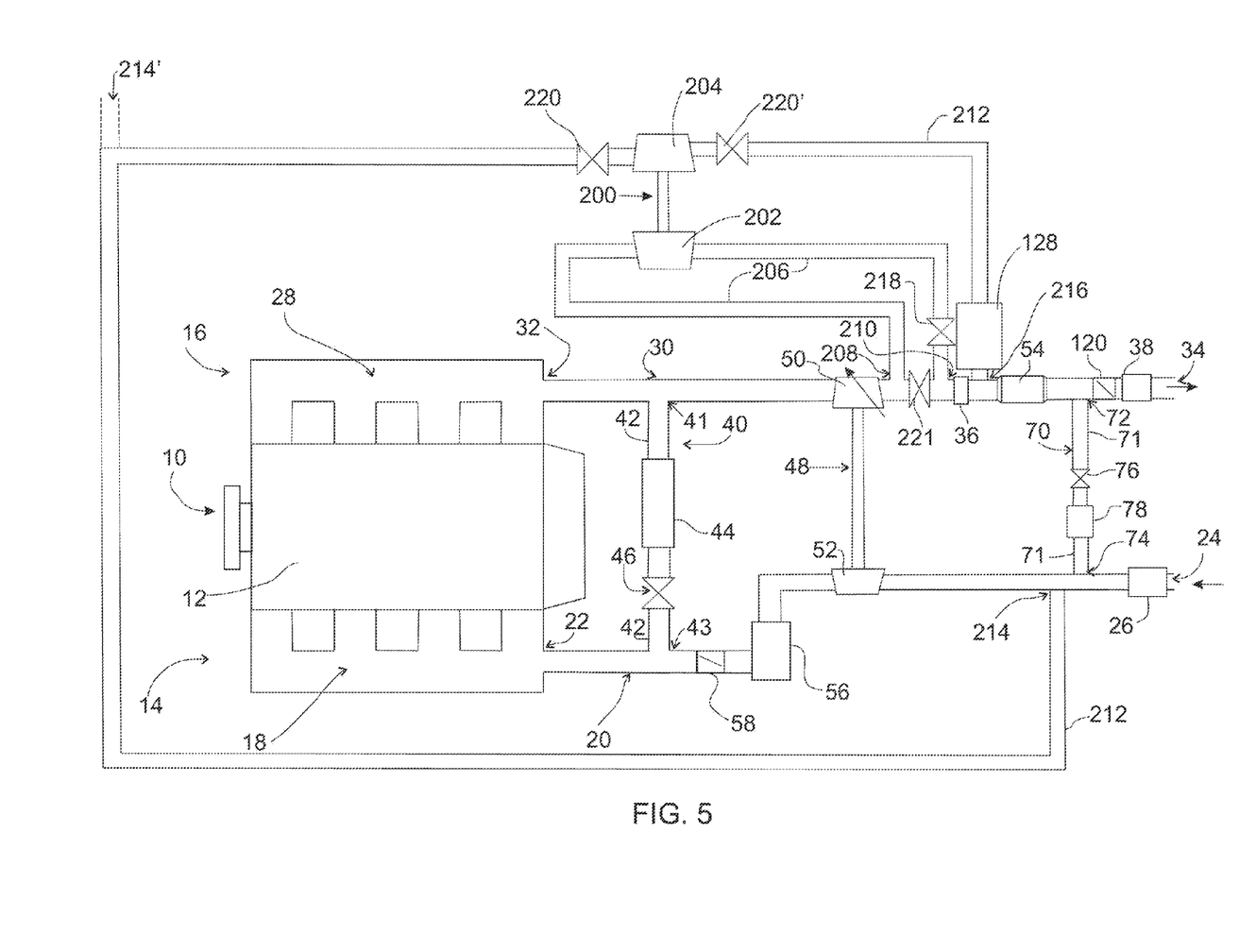
FIG. 5 is a schematic illustration of a breathing system including an exhaust driven air pump according to yet another exemplary embodiment of the invention.

Referring now to FIG. 5, in another exemplary embodiment, the first end 208 of the second exhaust conduit 206 may be connected to the exhaust side 16 at a location downstream of the first turbine 50. The second end 210 of the second exhaust conduit 206 may be connected to the exhaust side at a location downstream of the connection of the first end 208 and upstream of the particulate filter 54 and the connection of the first end 216 of the second air conduit 212 to the exhaust side 16. A first exhaust valve 218 may be connected to the exhaust side 16 at a location interposed between the connection of the first end 208 and the second end 210 of the second exhaust conduit to the exhaust side 16 to control the flow of exhaust gas through the second exhaust conduit 206. In yet another embodiment, the valves 218 and 221 may be combined as a three-way located at the connection point of the first end 208 of the second exhaust conduit 206 to the exhaust side 16 to control the flow of exhaust through the exhaust side 16 and through the second exhaust conduit 16.

The relative size relationship of the first turbocharger 48 when present and the exhaust driven air auxiliary pump 200 may vary. For example, in illustrative embodiments the exhaust driven air pump 200 may be the same or smaller in size than the first turbocharger 48. The first turbocharger 48 may be constructed and arranged to provide a pressure ration of the absolute outlet pressure over the inlet pressure of the turbocharger ranging from greater than 1.2 to about 2.5. The first turbocharger 48 may be constructed and arranged to provide a compressor 50 capacity sufficient to provide at least 100 percent of the air intake requirements of the combustion engine 12. In one exemplary embodiment, the exhaust driven air auxiliary pump 200 may be constructed and arranged to provide pressure ratio of the absolute outlet pressure over inlet pressure of the pump from about 1.3 to 2.5. In one embodiment the exhaust driven air auxiliary pump 200 may be constructed and arranged to provide less than the flow rate of air required by the engine 12. In one embodiment the exhaust driven air auxiliary pump 200 may be constructed and arranged to provide up one-half of the flow rate of air required by the engine 12. In one embodiment the exhaust driven air auxiliary pump 200 may be constructed and arranged to provide up one-third of the flow rate of air required by the engine 12. In one embodiment the exhaust driven auxiliary pump 200 is constructed and arranged to function as an emissions control component and not as a component used to enhance the performance of the engine such as a turbocharger. In various embodiments the exhaust driven auxiliary pump 200 may be constructed to not deliver air directly, or indirectly, into the air intake of the engine.

At least one of the first turbocharger 48 and the exhaust driven air pump 200 may be constructed and arranged to have a variable geometry turbine and/or compressor, for example, but not limited to having adjustable vanes to vary the capacity of the turbine and/or the compressor.

Utilizing the exhaust driven air pump 200 to provide compressed air to the burner 128 and/or to the exhaust side 16 upstream of the particulate filter 54 provides the advantage of more effective regeneration of the particulate filter in a relatively shorter time period. The amount of air being delivered to the burner 128 or to the particulate filter 54 from the exhaust driven air pump 200 is substantially greater than the air remaining in the exhaust gas after a substantial portion of the oxygen has been consumed in/with the combustion of fuel in the engine 12. Furthermore, in another exemplary embodiment, during cold starts oxygen-rich air may be delivered to the exhaust side 16 as needed to burn hydrocarbons and carbon monoxide for the catalytic converter 36. As a result, the exhaust temperature would increase dramatically causing the light-off temperature of the catalytic converter to be reached sooner thereby increasing the amount of $NO_x$, hydrocarbons and carbon monoxide being converted by the system soon after a cold start. Furthermore, in yet another exemplary embodiment relatively cool oxygen-rich air may be delivered to the exhaust side 16 upstream of the catalytic converter 36 to control the temperature in the catalytic converter which typically includes coatings that are very sensitive to high exhaust gas temperatures.

One exemplary embodiment may include a method including delivering compressed air directly into the exhaust side 16 using the exhaust driven air pump 200 Another exemplary embodiment may include a method including delivering compressed air to the burner 128 using the exhaust driven air pump 200 to support regeneration of the particulate filter 54. Another exemplary embodiment may include a method including delivering compressed air to the exhaust side 16 using the exhaust driven air pump 200 to support the burning of hydrocarbons/carbon monoxide in the exhaust side 16. In another embodiment may include a method including delivering compressed air the exhaust driven air pump 200 to cool exhaust gases and particularly cool the catalytic converter 36. In another exemplary embodiment the exhaust driven air pump 200 is positioned either upstream, and parallel to, or downstream in the first turbocharger 48 depending on the planned regeneration strategy. In one exemplary embodiment air may be drawn into the second compressor 204 either from the air intake side 14 or from the ambient atmosphere.

In another exemplary embodiment, a first exhaust valve 218 may be located either in front of or after the second turbine 202 to regulate exhaust gas flow into the second turbine 202. This valve can be an on/off or a linear control type valve depending upon the regeneration strategy. In another embodiment, a second exhaust valve 218, 221' may be utilized to force exhaust gas flow into the second turbine 202. This valve can be located in the exhaust side 16 upstream of the first turbine 50 or made an integral part of the first turbine 50. In another embodiment, the first and second exhaust valves 218, 221 may be combined into one component. In yet another embodiment, the second air valve 220 or 220' may be located either upstream or downstream of the second compressor 204 to regulate the flow of air through the second compressor 204. These valves 220, 220' can be either on/off or a linear control type valve depending upon the regeneration strategy. These valves 220, 220' may also be utilized to avoid reverse flow through the second compressor 204.

The above description of embodiments of the invention is merely exemplary in nature and, thus, variations thereof are not to be regarded as a departure from the spirit and scope of the invention.

What is claimed is:

1. A product comprising an air intake side constructed and arranged to deliver air to a combustion engine, an exhaust side constructed and arranged to expel combustion gases produced by the engine;
    the air intake side comprises a first air conduit wherein the first air conduit is defined as a length of pipe from an air intake to an intake manifold,
    the exhaust side comprises a primary exhaust gas conduit wherein the primary exhaust conduit is defined as a length of pipe from an exhaust manifold to an open end for discharging exhaust gas to the atmosphere,
    a first turbocharger comprising a first turbine in fluid communication with the primary exhaust conduit and a first compressor in fluid communication with the first air conduit,
    a second exhaust conduit connected to the primary exhaust conduit at a first end and connected to the primary exhaust conduit at a second end,
    a second air conduit having an air-receiving end and a second end connected to the primary exhaust conduit, the second end of the second air conduit connected to the primary exhaust conduit downstream from the first turbine,
    an exhaust driven air pump comprising a second turbine in fluid communication with the second exhaust conduit and a second compressor in fluid communication with the air receiving end of the second air conduit arranged upstream of an air intake of the first compressor to compress the air in the second air conduit into the primary exhaust conduit.

2. A product as set forth in claim 1 further comprising a combustion engine and wherein the exhaust driven air pump is constructed and arranged to deliver less than one-half of the air required of the engine.

3. A product at set forth in claim 2 further comprising a first turbocharger comprising a first turbine in fluid communication with the exhaust side and a first compressor in fluid communication with the air intake side and wherein the first turbocharger is construed and arranged to deliver at least one hundred percent of the air required to operate the engine.

4. A product as set forth in claim 1 wherein the air-receiving end of the second air conduit is connected to the air intake side.

5. A product as set forth in claim 1 wherein the air-receiving end of the second air conduit is open to the atmosphere.

6. A product as set forth in claim 1 further comprising an air valve in the second air conduit upstream of the second compressor.

7. A product as set forth in claim 1 further comprising an air valve downstream of second compressor.

8. A product as set forth in claim 1 further comprising a burner constructed and arranged to heat air flowing through the second air conduit.

9. A product as set forth in claim 1 wherein the second end of the second air conduit is connected to the primary exhaust conduit upstream of a catalytic converter in the primary exhaust conduit.

10. A product as set forth in claim 1 wherein the first end of the second exhaust gas conduit is connected to the primary exhaust conduit downstream of the exhaust manifold.

11. A product as set forth in claim 1 wherein the first end of the second exhaust conduit is connected to the primary exhaust conduit at the exhaust manifold.

12. A product as set forth in claim 1 wherein the second end of the second exhaust conduit is connected to the primary exhaust conduit upstream of the first turbine.

13. A product as set forth in claim 1 wherein the second end of the second exhaust conduit is connected to the primary exhaust conduit downstream of the first turbine.

14. A product as set forth in claim 1 wherein the first end of the second exhaust conduit is connected to the primary exhaust conduit downstream of the first turbine and wherein the second end of the second exhaust conduit is connected to the primary exhaust conduit downstream of a connection point of the first end of the second exhaust conduit to the primary exhaust conduit.

15. A product as set forth in claim 14 further comprising an exhaust valve positioned in the primary exhaust conduit at a location between the connection of the first end of the second exhaust conduit to the primary exhaust conduit and the connection of the second end of the second exhaust conduit to the primary exhaust conduit.

16. A product as set forth in claim 1 further comprising an exhaust valve connected to the primary exhaust conduit at a position between the connection of the first end of the second exhaust conduit to the primary exhaust conduit and the connection of the second end of the second exhaust conduit to the primary exhaust conduit.

17. A product as set forth in claim 1 further comprising a first valve in the second exhaust conduit upstream of the second turbine.

18. A product as set forth in claim 1 further comprising an exhaust valve in the second exhaust conduit downstream of the second turbine.

19. A product as set forth in claim 1 further comprising an exhaust valve at a connection point of the first end of the second exhaust conduit to the primary exhaust conduit.

20. A product as set forth in claim 1 further comprising a first exhaust gas recirculation line extending from the primary exhaust conduit to the air intake side, and further comprising an exhaust valve in the primary exhaust conduit located at at least one of upstream of a connection point of the first exhaust gas recirculation line to the primary exhaust conduit or downstream of the connection point of the first exhaust gas recirculation line to the primary exhaust conduit.

21. A product as set forth in claim 1 wherein the first end of the second exhaust conduit is connected to the primary exhaust conduit downstream of the first turbine, and the second end of the second exhaust conduit is connected to the primary exhaust conduit downstream of a connection point of the first end of the second conduit to the primary exhaust conduit and an exhaust valve in the primary exhaust conduit located between the connection points of the first end of the second exhaust conduit to the primary exhaust conduit and a connection point of the second end of the second exhaust conduit to the primary exhaust conduit.

22. A product as set forth in claim 1 further comprising one of a gasoline or a diesel engine connected to the primary exhaust conduit and air intake side.

23. A method comprising providing a combustion engine breathing system comprising an air intake side and an exhaust side, an auxiliary air pump driven by the exhaust side, a particulate filter in the exhaust side and a burner constructed and arranged to deliver heat to the particulate filter to regenerate the particulate filter including burning off particulates trapped therein, and a turbocharger having a turbine in fluid communication exhaust side and a compressor in fluid communication with the air intake side, delivering compressed air to the burner using the auxiliary air pump to support regeneration of the particulate filter.

24. A method as set forth in claim 23 further comprising delivering compressed air to the exhaust side using the auxiliary air pump to support the burning of hydrocarbons/carbon monoxide in the exhaust side during start-up of the combustion engine.

* * * * *